(12) United States Patent
Moon et al.

(10) Patent No.: US 8,832,426 B2
(45) Date of Patent: Sep. 9, 2014

(54) ELECTRONIC DEVICE AND METHOD FOR SECURING USER INPUT DATA

(75) Inventors: Ji Uk Moon, Seoul (KR); Kwang Baek Kim, Seoul (KR)

(73) Assignee: Pantech Co., Ltd., Seoul (KR)

( * ) Notice: Subject to any disclaimer, the term of this patent is extended or adjusted under 35 U.S.C. 154(b) by 23 days.

(21) Appl. No.: 13/332,136

(22) Filed: Dec. 20, 2011

(65) Prior Publication Data

US 2012/0265981 A1 Oct. 18, 2012

(30) Foreign Application Priority Data

Apr. 18, 2011 (KR) .................. 10-2011-0035869

(51) Int. Cl.
*G06F 12/14* (2006.01)

(52) U.S. Cl.
USPC ........... 713/150; 713/189; 713/190; 713/194; 345/156; 345/173

(58) Field of Classification Search
USPC ........... 345/156, 173; 713/150, 190, 194, 189
See application file for complete search history.

(56) References Cited

U.S. PATENT DOCUMENTS

| | | | | |
|---|---|---|---|---|
| 5,768,386 A | * | 6/1998 | Yokomoto et al. | 713/183 |
| 5,970,146 A | * | 10/1999 | McCall et al. | 713/194 |
| 6,317,835 B1 | * | 11/2001 | Bilger et al. | 713/194 |
| 8,123,123 B1 | * | 2/2012 | Doland et al. | 235/379 |
| 8,325,148 B2 | * | 12/2012 | Anson et al. | 345/173 |
| 2011/0025610 A1 | | 2/2011 | Whytock et al. | |
| 2011/0271159 A1 | * | 11/2011 | Ahn et al. | 714/724 |
| 2012/0265980 A1 | | 10/2012 | Moon et al. | |
| 2012/0303964 A1 | | 11/2012 | Kim | |

* cited by examiner

*Primary Examiner* — Saleh Najjar
*Assistant Examiner* — Peiliang Pan
(74) *Attorney, Agent, or Firm* — H.C. Park & Associates, PLC

(57) ABSTRACT

An apparatus to secure input data includes a main processor to enter into a secure mode, a touch panel to detect an input, and a touch integrated circuit (IC) to obtain coordinate data of the input, and to encrypt data related to the input using a secure key, in which the data related to the input is encrypted in the secure mode, and the touch IC transmits the encrypted data to the main processor. A method for securing input data in an electronic device includes entering into a secure mode, receiving an input using a touch panel, obtaining coordinate data of the input using a touch integrated circuit (IC), and encrypting data related to the input using a secure key, in which the data related to the input is encrypted in the secure mode, and the touch IC transmits the encrypted data to the main processor.

22 Claims, 9 Drawing Sheets

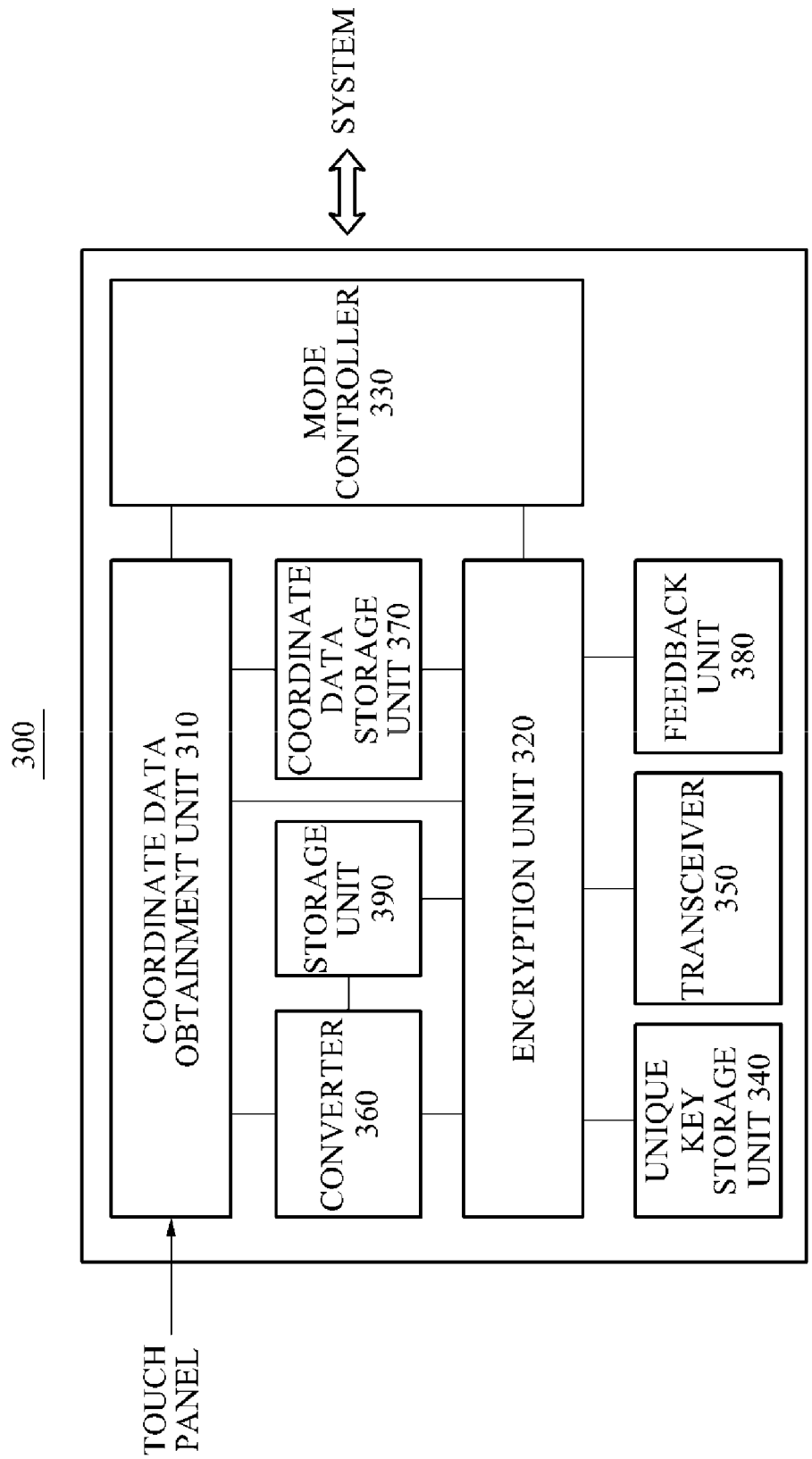

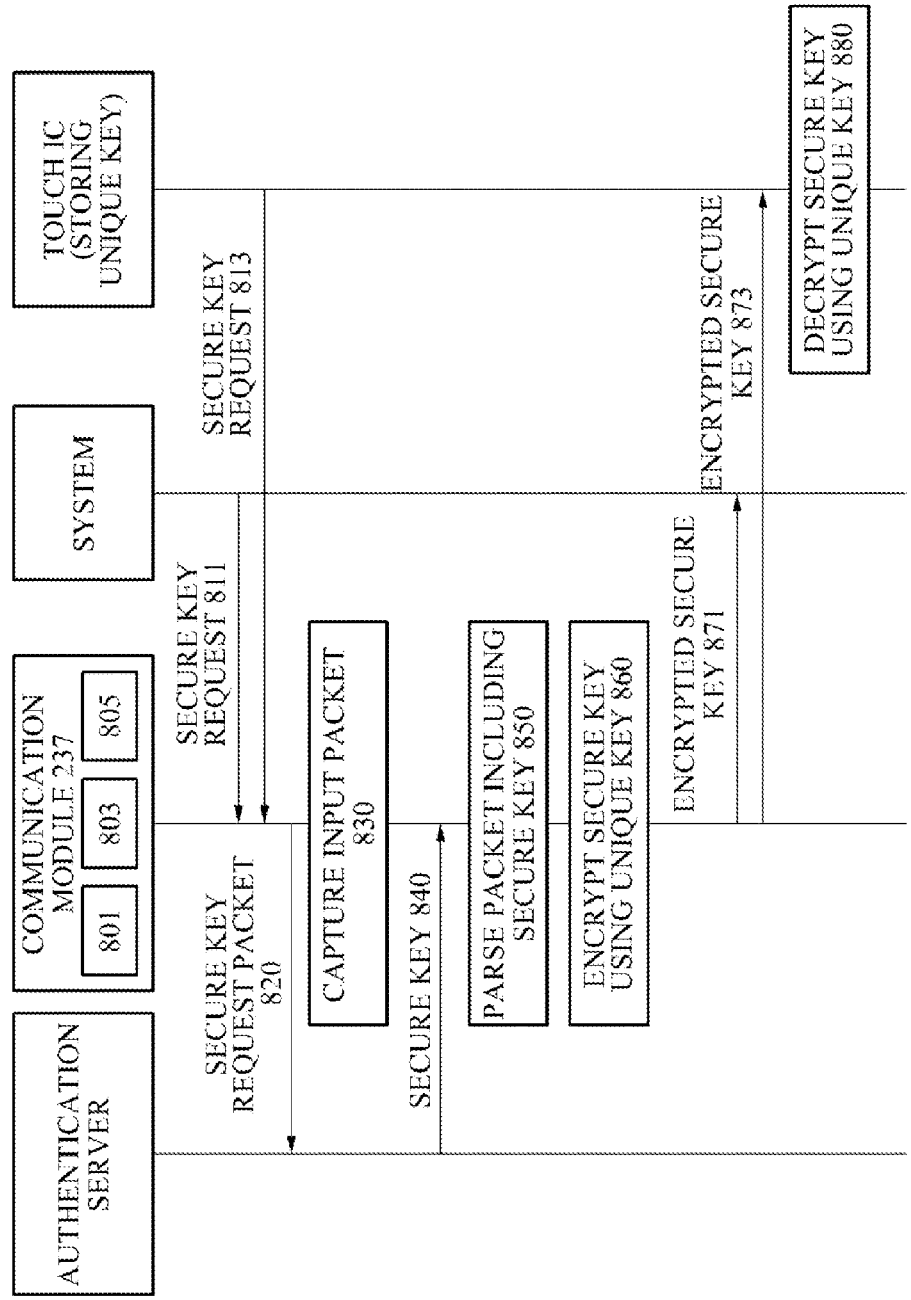

ELECTRONIC DEVICE AND METHOD FOR SECURING USER INPUT DATA

CROSS-REFERENCE TO RELATED APPLICATION

This application claims priority from and the benefit under 35 U.S.C. §119(a) of Korean Patent Application No. 10-2011-0035869, filed on Apr. 18, 2011, which is incorporated by reference for all purposes as if fully set forth herein. This application is related to U.S. patent application Ser. No. 13/332,102, filed on Dec. 20, 2011, which claims priority from and the benefit of Korean Patent Application No. 10-2011-0035866, filed on Apr. 18, 2011, and U.S. patent application Ser. No. 13/332,116, filed on Dec. 20, 2011, which claims priority from and the benefit of Korean Patent Application No. 10-2011-0050565, filed on May 27, 2011, all of which are assigned to the same assignee as the current application, and all of which are incorporated by reference in its entirety as if fully set forth herein.

BACKGROUND

1. Field

This disclosure relates to an electronic device and a method for securing input data of an electronic device, and a communication system using a security feature to protect the input data.

2. Discussion of the Background

Applications using a security feature, such as a financial program, have been frequently used in an electronic device, such as a smart phone, a tablet personal computer (PC), and the like. However, these applications may be vulnerable to a hacking attack against such electronic devices. For example, an electronic device using an open source operating system (OS) may be further vulnerable to the hacking attack.

A secure method using a virtual keyboard provided on a web server may be used to reduce a possibility of a hacking attack. However, the electronic devices using the secure method via the virtual keyboard may access the web server and thus, may become vulnerable to hacking attacks while accessing the web server.

SUMMARY

Exemplary embodiments of the present invention provide an apparatus and a method for providing security in an electronic device by encrypting information, input via a touch screen or a touch panel, using a touch integrated circuit (IC).

Additional features of the invention will be set forth in the description which follows, and in part will be apparent from the description, or may be learned by practice of the invention.

Exemplary embodiments of the present invention provide an apparatus to secure input data including a main processor to enter into a secure mode, a touch panel to detect an input, and a touch integrated circuit (IC) to obtain coordinate data of the input, and to encrypt data related to the input using a secure key, in which the data related to the input is encrypted in the secure mode, and the touch IC transmits the encrypted data to the main processor.

Exemplary embodiments of the present invention provide an electronic device including a main processor to enter into a secure mode; a touch panel to detect an input; a touch integrated circuit (IC) to encrypt, using a secure key, coordinate data of the input, or an input value corresponding to the coordinate data; and a communication module to transmit the encrypted coordinate data or the encrypted input value to a server, in which the touch IC receives a request signal to enter the secure mode to perform encryption of the coordinate data of the input or the input value corresponding to the coordinate data in the secure mode, and which the touch IC blocks a transfer path between the touch IC and the main processor of the electronic device to prevent the input detected during the secure mode from being sensed, received, or read by the main processor.

Exemplary embodiments of the present invention provide a method for securing input data in an electronic device including entering into a secure mode, receiving an input using a touch panel, obtaining coordinate data of the input using a touch integrated circuit (IC), and encrypting data related to the input using a secure key, in which the data related to the input is encrypted in the secure mode, and the touch IC transmits the encrypted data to a main processor.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 3 is a block diagram illustrating a touch integrated circuit (IC) according to an exemplary embodiment of the invention.

FIG. 8 is a diagram illustrating a method for obtaining a secure key according to an exemplary embodiment of the invention.

DETAILED DESCRIPTION OF THE ILLUSTRATED EMBODIMENTS

Figure 1:
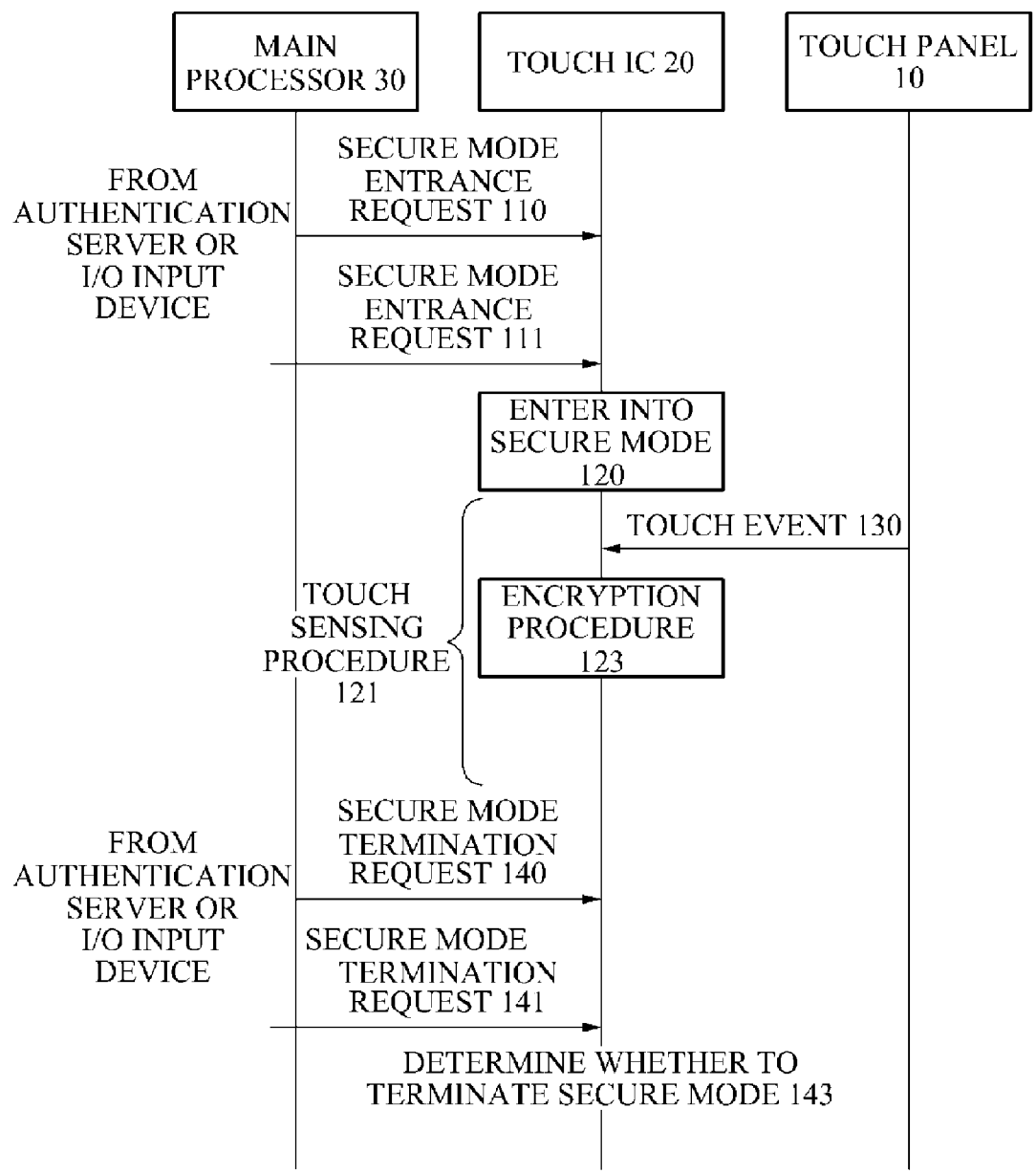
FIG. 1 is a diagram illustrating a method for securing input data according to an exemplary embodiment of the invention.

Exemplary embodiments are described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Throughout the drawings and the detailed description, unless otherwise described, the same drawing reference numerals are understood to refer to the same elements, features, and structures. The relative size and depiction of these elements may be exaggerated for clarity, illustration, and convenience.

It will be understood that when an element is referred to as being "connected to" another element, it can be directly connected to the other element, or intervening elements may be present. In contrast, if an element is referred to as being "directly connected to" another element, no intervening elements are present.

FIG. 1 is a diagram illustrating a method for securing input data according to an exemplary embodiment of the invention.

Referring to FIG. 1, security of input data may be provided by a touch integrated circuit (IC) 20, which may encrypt the input data received from a touch panel 10 and thereby enabling a main processor 30 of an electronic device to become unaware of what may be included in the input data. The input data may be provided by a user or an apparatus communicating with the IC 20. However, for the simplicity in disclosure, inputs provided by the user or the apparatus may be referred to as "user input" or simply "input".

A touch IC may encrypt data that is inputted via a touch panel in a secure mode and may not perform encryption if an electronic device is in a non-secure mode.

The following exemplary methods may be used for enabling the main processor 30 of the electronic device to become unaware of the data inputted during the secure mode:

1) Method 1: corresponds to a method that enables the main processor 30 of the electronic device to not recognize, sense or detect a touch input that may be received during the secure mode. For example, in the secure mode, the touch IC 20 may enable the main processor 30 to not sense the touch event or touch input by blocking a physical or software connection path between the touch IC 20 and the main processor 30 or between the touch panel 10 and the main processor 30.

2) Method 2: corresponds to a method in which the touch event or touch input may be sensed by the main processor 30 of the electronic device, and data corresponding to the touch input, which may be encrypted after the touch event or touch input is sensed, may not be transferred to the main processor 30 of the electronic device. In this method, the touch IC 20 may transmit encrypted input data to a server via a communication module of the electronic device without intervention of the main processor 30.

3) Method 3: corresponds to a method in which the touch event or touch input may be sensed by the main processor 30 of the electronic device, and data corresponding to the touch input, which may be encrypted after the touch event or touch input is sensed, may be transferred to the main processor 30 of the electronic device. In this method, the input data may be encrypted by the touch IC 20 and thus, the main processor 30 may be unaware of the information included in the encrypted data corresponding to the touch input.

The above Method 1, Method 2, and Method 3 will be further described with reference to FIG. 2 and FIG. 3. The above Method 1, Method 2, and Method 3 are provided as examples for enabling the main processor 30 of the electronic device to become unaware of what the input data is and the methods may not be limited to the referenced methods thereof. Therefore, various embodiments may be configured.

Referring again to FIG. 1, in operation 110 or operation 111, the touch IC 20 may receive a request signal to enter a secure mode or a secure mode entrance request signal to request entrance into the secure mode or to initiate a secure mode. Here, the secure mode may be requested if an application requesting a security feature is executed. The application requesting the security feature may be, an application associated with finance, an application containing personal information of the user, private contact information, and the like. Further, the secure mode may be requested if an input of a password is prompted, for example, a case where the electronic device accesses an external server to log in, a case where an application is to be purchased in an application store, and the like. Operation 110 may correspond to a case where the secure mode entrance request signal is received via the main processor 30, and operation 111 may correspond to a case where the secure mode entrance request signal is directly or indirectly received by the touch IC 20 without intervention of the main processor 30.

In operation 110 or operation 111, the secure mode entrance request signal may occur if an input of a reference number or a reference pattern of input is sensed or detected via the touch panel 10, if a referenced motion of a user or the electronic device is sensed or detected via a sensor, if an input of a referenced number or a reference input pattern is provided using other input devices excluding the touch panel, and the like. The user may manipulate the electronic device to execute the secure mode by touching a referenced number key or button on the input interface.

In operation 111, the secure mode entrance request signal may be received from an authentication server over a network. The authentication server may refer to a server that may make a request to encrypt an object to be transmitted. For example, a server of a financial company or an organization dealing with sensitive information may be the authentication server. The authentication server may be a separate server for authenticating the user. If the secure mode entrance request signal is received from the authentication server, the received secure mode entrance request signal may be configured to be transferred from the communication module to the touch IC 20 without intervention of the main processor 30.

In operation 110 or operation 111, the main processor 30 may transmit information about an area of the input interface occupying in the touch panel 10, or conversion based data to the touch IC 20. The secure key may indicate a key value that may be used to encrypt the input data. The term "secure key" may refer to a key value that may be used to encrypt the input data using the touch IC 20. The secure key may be a symmetric key or an asymmetric key. As described above, the secure key may be transferred from the main processor 30 to the touch IC 20, or be embedded in the touch IC 20. The secure key embedded in the touch IC 20 may be a key value that is stored in a secure memory area inaccessible from an outside and is allocated in production of the touch IC 20. The secure key may be received from the authentication server according to, for example, a method illustrated in FIG. 8. The secure memory area of the touch IC 20 may store information about the area of the input interface occupying in the touch panel 10 or conversion based data. The secure memory area may be configured as a memory area that may be accessible using a reference key.

If the secure mode entrance request signal is received, the touch IC 20 enters into the secure mode in operation 120. The secure mode may be a mode to encrypt the data input received from the user. In the secure mode, the touch IC 20 may activate an encryption unit that may perform an encryption algorithm.

If a touch event 130 occurs in the secure mode, the touch IC 20 may perform an encryption procedure 123. The encryption procedure 123 may refer to reference procedures for encrypting the input data. For example, the encryption procedure 123 may include a procedure for encrypting coordinate data or data related to the input. The encryption procedure 123 may include a procedure for encrypting N pieces of coordinate data or data related to the input. The encryption procedure 123 may include a procedure for encrypting, by the touch IC 20, an input value or data related to the input. The touch IC 20 may perform a touch sensing procedure 121 periodically in the secure mode. The touch sensing procedure 121 may refer to reference procedures for sensing a touch event. That is, the touch sensing procedure 121 may include a procedure of sensing the occurrence of the touch event by scanning the touch panel 10 at reference intervals.

In the secure mode, the touch IC 20 may perform optimization for encryption of data. For example, in the secure mode, the touch IC 20 may adjust a system resource allocation with respect to one or more of the touch sensing procedure 121 of sensing the touch event and the encryption procedure 123 of encrypting the coordinate data or data related to the input. In the secure mode, the touch IC 20 may allocate a relatively larger amount of system resources to the encryption procedure compared to the touch sensing procedure 121. For example, the touch IC 20 may decrease an amount of system resources allocated to the touch sensing procedure 121 by extending an interval of scanning the touch panel 10.

If the data input of the user is determined to be completed in the secure mode, or if there is a request to terminate the secure mode, the touch IC 20 may receive a secure mode termination request signal in operation 140 or operation 141. The secure mode termination request signal may be a signal to request termination of the secure mode. Here, whether data inputted by the user is determined to be completed may be recognized using various schemes. For example, data inputted by the user may be determined to be completed, without limitation, if a password is inputted, if a reference number of digits is inputted, if a key indicating user has completed inputting data is touched, if a login key is touched, or if a touch event does not occur for a reference period of time. Similar to the secure mode entrance request signal, the secure mode termination signal may occur if an input of a reference number or a reference input pattern is sensed via the touch panel 10, if a reference motion of the user or an electronic device is sensed via a sensor, if an input of a reference number or a reference input pattern using other input devices excluding the touch panel 10 occurs, and the like. The secure mode termination signal may be received from the authentication server, which may be similar to the secure mode entrance request signal.

In operation 143, the touch IC 20 may determine whether to terminate the secure mode. That is, if data input of the user is determined to be completed in the secure mode, the touch IC 20 may terminate the secure mode. If the secure mode is terminated, or if the secure mode termination request signal is received, the touch IC 20 may deactivate the encryption unit.

If the data input of the user is completed, or if the secure mode is terminated, the touch IC 20 may delete some or all of the data inputted during the secure mode excluding the encrypted data.

Data encrypted using the secure key may be decrypted in a server having a decryption key corresponding to the secure key. Here, the decryption key corresponding to the secure key may refer to an encryption key that maybe the same or similar as the secure key used to encrypt the input data, or an encryption key that has a pairing relationship with the secure key used to encrypt the input data.

Figure 2:
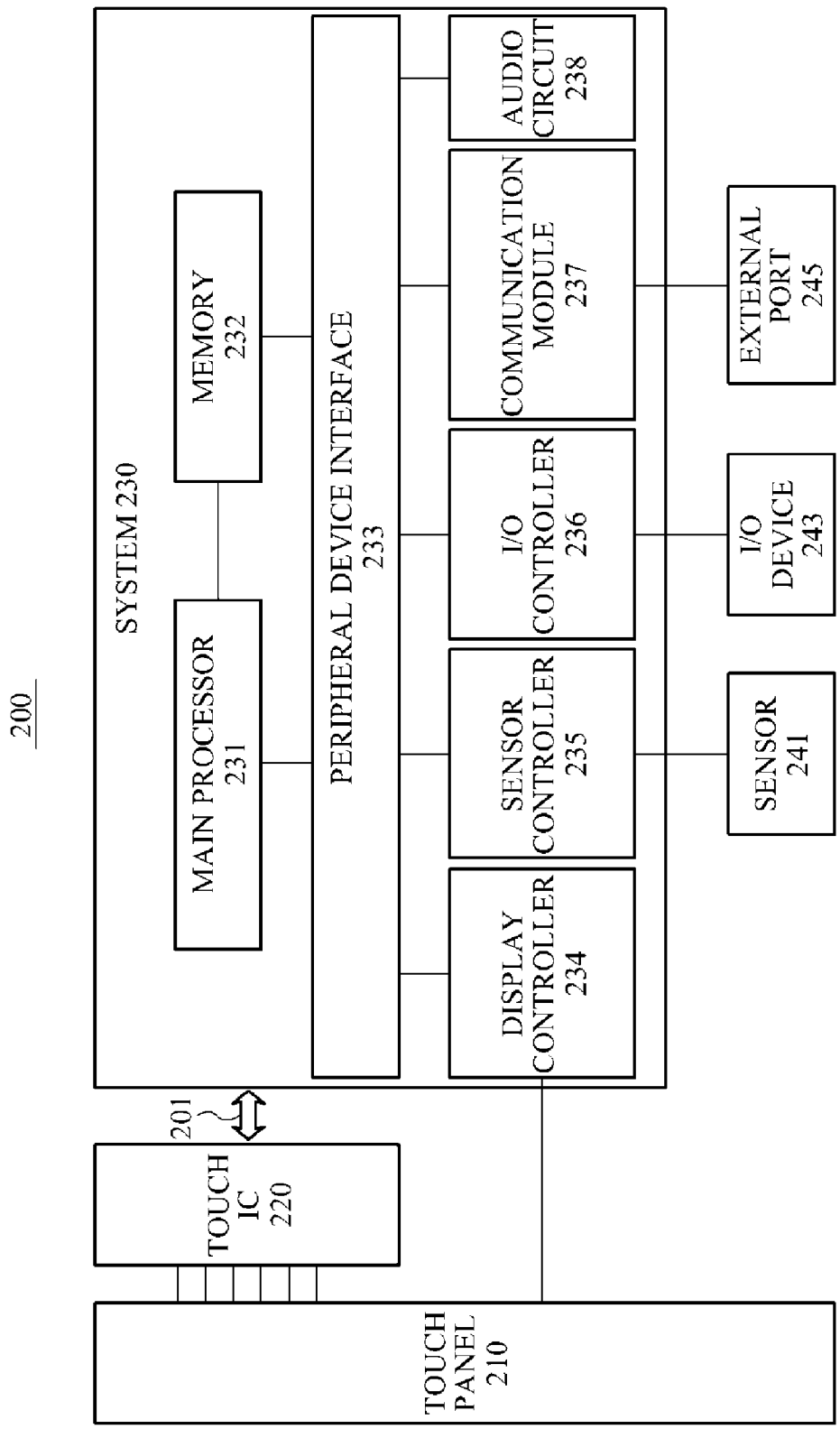
FIG. 2 is a block diagram illustrating an electronic device according to an exemplary embodiment of the invention.

FIG. 2 is a block diagram illustrating an electronic device 200 according to an exemplary embodiment of the invention.

Referring to FIG. 2, the electronic device 200 includes a touch panel 210, a touch IC 220, and a system 230. The touch panel 210 and the touch IC 220 may correspond to an input data securing apparatus of an electronic device according to an exemplary embodiment. The electronic device 200 may further include a sensor 241, an input/output (I/O) device 243, and an external port 245.

The touch panel 210 may provide an input interface to receive data input of a user. That is, the touch panel 210 may display a keyboard or an input mechanism to enable the user to input data, such as a number, a character, a symbol, and the like, using a touch operation. Here, the keyboard displayed on the touch panel 210 is provided as an example of the input interface and is not limited thereto, thus the input interface may be provided in various forms. Further, the touch panel 210 may include a touch screen, which may include a touch sensing area and a display area.

The touch IC 220 may be connected to the touch panel 210 to sense an electrical signal received from the touch panel 210. The touch IC 220 may encrypt data input via the touch panel 210 in the secure mode. A program to perform various types of encryption algorithms may be embedded in the touch IC 220. The touch IC 220 may convert the electrical signal into data having a reference meaning and may encrypt the converted data. The touch IC 220 may encrypt data using a secure key. For example, the touch IC 220 may encrypt coordinate data about a location where a touch event occurs. The touch IC 220 may convert the coordinate data to numbers or characters, and may encrypt the numbers or the characters. Encryption may be performed while the touch IC 220 receives an input in the secure mode or after the input is received. The encryption performed by the touch IC 220 may be independently performed without intervention of the system 230.

According to the above Method 1, the touch IC 220 may block a transfer path 201 of the touch event so that the touch event occurring in the secure mode may not be sensed by a main processor 231 of the electronic device 200. According to the above method 1, the main processor 231 may be configured to not sense the occurrence of the touch event itself. In the secure mode, the system 230 may not sense the occurrence of the touch event.

According to the above Method 2, the touch IC 220 may transfer, to the system 230 or the main processor 231, information about whether the touch event has occurred in the secure mode. In this instance, the touch IC 220 may block the transfer path 201 of coordinate data or an input value so that the coordinate data or the input value may not be sensed or received by the main processor 231.

According to the above Method 3, the touch IC 220 may transfer, to the system 230 or the main processor 231, information about whether the touch event has occurred in the secure mode, and may transfer encrypted coordinate data or an encrypted input value to the system 230 or the main processor 231.

In Method 2 or Method 3, information about whether the touch event has occurred may be transferred to the system 230 or the main processor 231 in a form of a feedback signal regardless of input data. The feedback signal will be further described with reference to FIG. 3. According to the above Method 2 or Method 3, in the secure mode, the system 230 may become aware of whether the touch event has occurred, however, the system 230 may be unaware of what the input value is since encrypted data is received.

The touch IC 220 may sense an electrical signal received from the touch panel 210 to be aware of that the touch event has occurred via the input interface. Here, the touch event may occur using a finger of the user. The touch event may occur using an instrument, such as a stylus. Types of the touch event may include, for example, a gesture, a drag, a tap, a multi-tap, a flick, and the like. If the touch event occurs via the input interface, the touch IC 220 may encrypt coordinate data about an occurrence location of the touch event, or an input value that is converted from the coordinate data to a value corresponding to the input data using the secure key.

The system 230 may include the main processor 231, a memory 232, a peripheral device interface 233, a display controller 234, a sensor controller 235, an I/O controller 236, a communication module 237, and an audio circuit 238. The system 230 or system may refer to components excluding the touch panel 210 and the touch IC 220 from among components included in the electronic device 200. Each of the components included in the system 230 may perform communication via at least one communication bus or signal line. Each of the components may be configured by hardware, software, or combination thereof.

The main processor 231 may transmit a signal to change an operation mode of the touch IC 220. That is, the main processor 231 may transmit, to the touch IC 220, a secure mode entrance request signal to request entrance into the secure mode, which is described above in operation 110. The main processor 231 may provide conversion operation based data to the touch IC 220. The conversion based data may include coordinate information allocated to one or more number keys, character keys, or symbol keys that may be provided via the input interface. The conversion based data will be described later part of this disclosure.

The main processor 231 may include one or a plurality of processors. That is, the main processor 231 may include a plurality of processors that may be configured to perform a plurality of operations, respectively.

The memory 232 may include, for example, a high-speed random access memory (HSRAM), a magnetic disk, a static random access memory (SRAM), a read only memory (ROM), a flash memory, a non-volatile memory, and the like. The memory 232 may store a software module used in an operation of the electronic device 200, a set of commands, other various data, and the like.

The peripheral device interface 233 may combine a peripheral input and/or output device of the electronic device 200 with the main processor 231 and the memory 232.

The display controller 234 may display a visual output about the user by controlling the touch panel 210. For example, the display controller 234 may receive a feedback signal from the touch IC 220 and display a reference symbol in response. In this example, the display controller 234 may display the feedback signal without intervention of the main processor 231.

The sensor controller 235 may control various sensors 241 included in the electronic device 200 and receive sensing data from the sensor 241. For example, the sensor controller 235 may activate or deactivate a gyro sensor, a terrestrial magnetic sensor, and the like. The sensor 241 may be configured to include a plurality of sensors. For example, the sensor 241 may include a motion sensor, a gyro sensor, a terrestrial magnetic sensor, and the like.

The I/O controller 236 may transmit a signal to the I/O device 243 or may receive a signal from the I/O device 243. For example, the I/O device 243 may include a physical button, a light emitting diode (LED), a physical keyboard, a vibration motor, and the like.

The communication module 237 may transmit data, received from the touch IC 220, to a server. Here, the communication module 237 may transmit the received data to the server without intervention of the main processor 231. If the touch event occurs, the communication module 237 may transmit the encrypted coordinate data or the encrypted input value to the server. The input value will be further described with reference to FIG. 6.

Further, as shown in FIG. 8, the communication module 237 may include a unique key storage unit 801, a parsing unit 803, and an encryption unit 805. That is, the communication module 237 may be configured as an IC. The unique key storage unit 801, the parsing unit 803, and the encryption unit 805 will be described with reference to FIG. 8.

The communication module 237 may include a radio frequency (RF) circuit to convert an electrical signal into an electromagnetic signal and/or converting the electromagnetic signal into the electrical signal. In addition, RF circuit may be used to communicate with a communication network and other communication networks using the electrical signal. The communication module 237 may include at least one circuit element to perform communication of, for example, Global System for Mobile Communications (GSM), Enhanced Data GSM Environment (EDGE), wideband code division multiple access (W-CDMA), code division multiple access (CDMA), time division multiple access (TDMA), Bluetooth®, Institute of Electrical and Electronics Engineers (IEEE) 802.11a, IEEE 802.11b, IEEE 802.11g and/or IEEE 802.11n, and the like, Wireless Fidelity (Wi-Fi), voice over Internet Protocol (VoIP), Wi-MAX®, Long Term Evolution (LTE)®, radio frequency identification (RFID), Near Field Communication (NFC), and the like.

The audio circuit 238 may provide an audio interface between a user and the electronic device 200 using a speaker and/or a microphone.

The external port 245 may be an interface connected to an external device. For example, the external port 245 may include a universal serial bus (USB) port, an external monitor connection port, and the like.

FIG. 3 is a block diagram illustrating a touch IC according to an exemplary embodiment of the invention.

Referring to FIG. 3, the touch IC 300 may include a coordinate data obtainment unit 310 and an encryption unit 320. The touch IC 300 may further include a mode controller 330, a unique key storage unit 340, a transceiver 350, a converter 360, a coordinate data storage unit 370, a feedback unit 380, and a storage unit 390.

If a touch event occurs via an input interface, the coordinate data obtainment unit 310 may obtain coordinate data about an occurrence location of the touch event. In this example, the coordinate data may be an X axis coordinate and a Y axis coordinate indicating a reference location on a touch panel.

If the touch event occurs, the encryption unit 320 may encrypt the coordinate data about the occurrence location of the touch event using a secure key. If the touch event occurs, the encryption unit 320 may encrypt the input value using the secure key. If data input by a user is determined to be completed, the encryption unit 320 may encrypt N pieces of coordinate data that may be stored in the coordinate data storage unit 370, using the secure key. If the data input by the user is determined to be completed, the encryption unit 320 may encrypt N input values with respect to the N touch events, respectively. The encryption unit 320 may encrypt coordinate data using various encryption algorithms capable of encrypting data, in addition to an encryption scheme using the secure key. Methods and processes for determining whether the N input values are completed are disclosed in application Ser. Nos. 13/332,102 and 13/332,116 filed on Dec. 20, 2011 and Dec. 20, 2011 respectively, which claim priority from and the benefit of Korean Patent Application Nos. 10-2011-0035866 and 10-2011-0050565, filed on Apr. 18, 2011 and May 27, 2011 respectively, and which are assigned to the same assignee as the current application, and all of which are incorporated by reference in its entirety as if fully set forth herein.

If a secure mode entrance request signal to request entrance into a secure mode is received, the mode controller 330 may activate the encryption unit 320. If a secure mode termination request signal to request termination of the secure mode is received, the mode controller 330 may deactivate the encryption unit 320.

According to Method 1, the mode controller 330 may control the touch IC 300 so that the touch event occurring in the secure mode may not be sensed by a main processor of an electronic device. According to Method 2, the mode controller 330 may transfer, to a system or the main processor, information about whether the touch event has occurred in the secure mode, and control the touch IC 300 so that coordinate data or an input value may not be sensed by the main processor. According to Method 3, the mode controller 330 may transfer, to the system or the main processor, information about whether the touch event has occurred in the secure mode, and control the touch IC 300 to transfer encrypted coordinate data or an encrypted input value to the system or the main processor.

In the secure mode, the mode controller 330 may adjust a system resource allocation with respect to a touch sensing procedure of sensing the touch event and an encryption procedure of encrypting the coordinate data. Here, in the secure mode, the mode controller 330 may allocate a larger amount of system resources to the encryption procedure compared to the touch sensing procedure.

The unique key storage unit 340 may store a unique key that may be allocated to the touch IC 300 and a communication module of the electronic device.

The feedback unit 380 may generate a feedback signal indicating that a touch is sensed with respect to the touch event, and may provide the feedback signal to an application being executed or a display controller. The feedback signal may correspond to a random value or a reference unique value. For example, the feedback signal may be X and Y coordinates of a reference area, instead of actual coordinate data. If the system receives the feedback signal, the system may notify the user that the touch is sensed using a vibration, LED lighting, displaying of a reference symbol, and the like. In this example, the feedback signal may correspond to a random value or a reference unique value. For example, regardless of an input value, a reference signal and the like may be used as the feedback signal. Accordingly, the main processor may be unaware of input data using the feedback signal.

Hereinafter, constituent elements of the touch IC 300 will be further described with reference to FIG. 4A, FIG. 4B, FIG. 5, FIG. 6, FIG. 7, and FIG. 8.

Figure 4A:
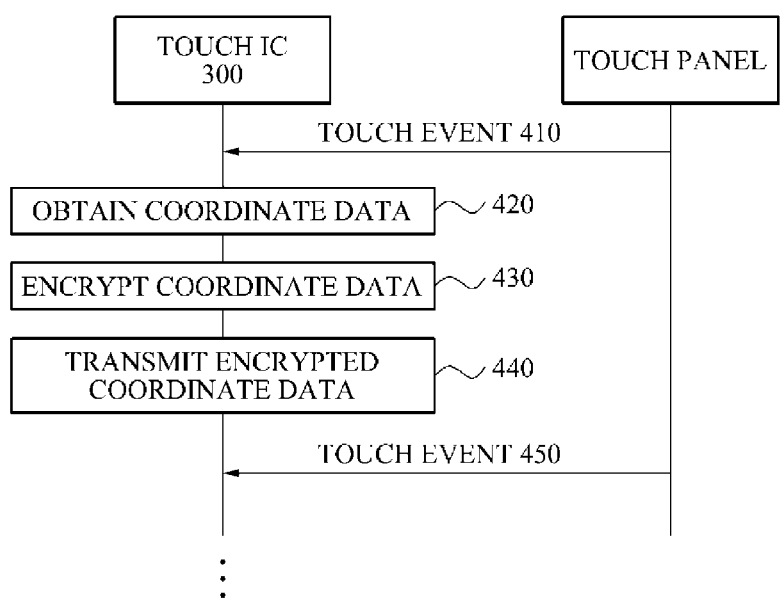
FIG. 4A is a diagram illustrating a method for securing input data according to an exemplary embodiment of the invention.

FIG. 4A is a diagram illustrating a method for securing input data according to an exemplary embodiment of the invention.

Referring to FIG. 4A, if a touch event occurs in operation 410, the coordinate data obtainment unit 310 may obtain coordinate data about an occurrence location of the touch event in operation 420. The coordinate data may be an X axis coordinate and a Y axis coordinate of the touch panel. That is, the coordinate data obtainment unit 310 may calculate coordinate data based on a change in a capacitance, an amount of current, and the like, of a touch sensor. The coordinate data obtainment unit 310 may calculate the coordinate data using a change in an electrical resistance of the touch sensor and the like. That is, the touch sensor may be configured using various schemes, for example, a capacitive type, a decompression type, and the like.

In operation 430, the encryption unit 320 may encrypt coordinate data about the occurrence location of the touch event using a secure key. The secure key may be a key value for an asymmetric or symmetric encryption.

In operation 440, the transceiver 350 may transmit the encrypted coordinate data to the server via the communication module of the electronic device. According to Method 1 or Method 2, the transceiver 350 may transfer the encrypted coordinate data to the communication module without intervention of the main processor. According to Method 3, the transceiver 350 may transfer the encrypted data to the communication module via the main processor of the electronic device. The transceiver 350 may transmit, to the server via the communication module, information about a resolution of the touch panel, a size of the touch panel, and a location of the input interface in the touch panel, specification information of the touch panel, specification information of the electronic device, and the like. The specification information of the electronic device or the touch panel may be transmitted to the server to enable the server to decrypt encrypted coordinate data and then become aware of an input value using the coordinate data. Since coordinate data with respect to the same input may vary based on the size of the touch panel, the transceiver 350 may transmit the specification information of the electronic device or the touch panel to the server. The server may become aware of the input value from the coordinate data using a lookup table in which the coordinate data and the input value are mapped.

The encryption unit 320 may perform encryption if the touch event occurs. That is, if a new touch event occurs in operation 450, the encryption unit 320 may encrypt coordinate data about the new touch event. The transceiver 350 may transmit, to the server via the communication module of the electronic device, the coordinate data of the touch event.

Figure 4B:
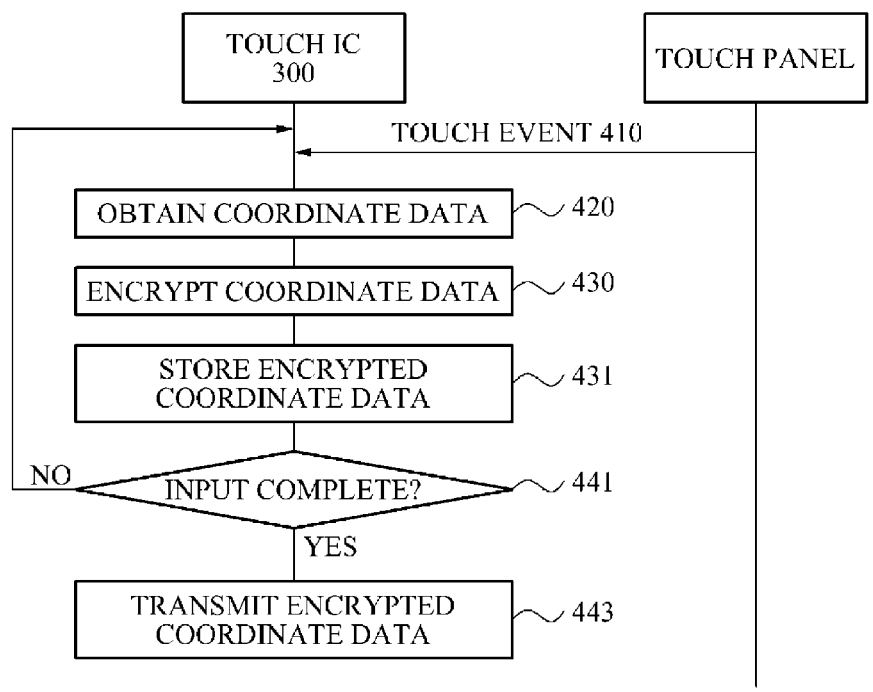
FIG. 4B is a diagram illustrating a method for securing input data according to an exemplary embodiment of the invention.

Operation 440 of FIG. 4A may be replaced with operations 431 and operation 443 of FIG. 4B. That is, the transceiver 350 may store data encrypted in response to the touch event that occurs in operation 431, and may determine whether input entered by the user or user input is completed in operation 441. If it is determined that the user input is determined to be completed or if the secure mode is determined to be terminated, the transceiver 350 may also transmit the stored data, that is, the encrypted data to the server via the communication module of the electronic device.

Figure 5:
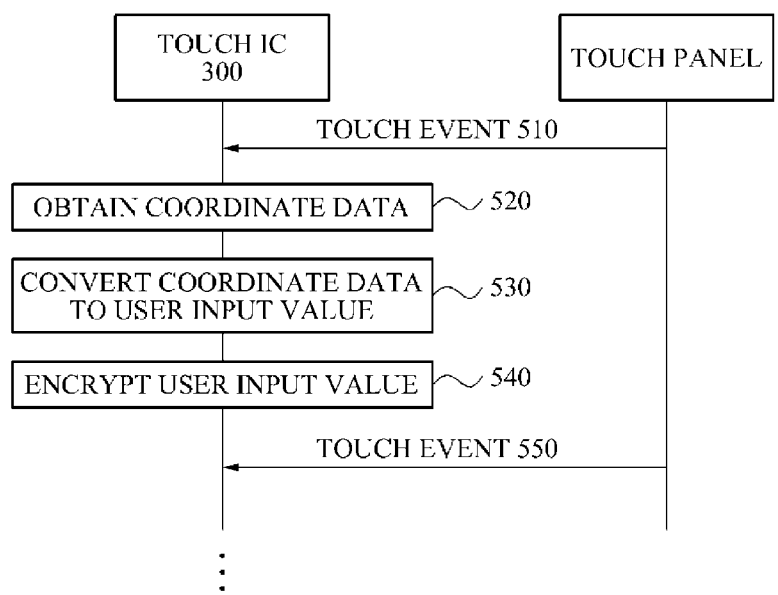
FIG. 5 is a diagram illustrating a method for securing user input data according to an exemplary embodiment of the invention.

FIG. 5 is a diagram illustrating a method for securing input data according to an exemplary embodiment of the invention.

If a touch event occurs in operation 510, the coordinate data obtainment unit 310 may obtain coordinate data about an occurrence location of the touch event in operation 520.

In operation 530, a converter 360 may convert the coordinate data into an input value corresponding to input data. Here, the converter 360 may convert the coordinate data into the input value corresponding to the input data based on the conversion based data. Conversion factors used to convert the coordinate data into the user input value may be stored in the storage unit 390. The conversion based data may include "coordinate information allocated to one or more number keys, character keys, or symbol keys that may be provided via the input interface". For example, X axis coordinate ranging from 0.1 to 1.0 and Y axis coordinate ranging from 2.5 to 3.0 may be allocated to a number key "1", and X axis coordinate ranging from 1.01 to 2.0 and Y axis coordinate ranging from 2.5 to 3.0 may be allocated to a number key "2". Accordingly, if coordinate data equals to (0.8, 2.6), the input value may be "1". If coordinate data equals to (1.5, 2.6), input value may be "2". The converter 360 may provide, to the encryption unit 320, a value that may be obtained by applying a reference operation to an actual input value. If a type of the input interface is changed, or if the input interface keeps changing, the conversion based data may include information that may be changed based on the type of the input interface. For example, if the arrangements of numbers displayed on the input interface are changed at reference intervals, the conversion based data may also be changed correspondingly. Accordingly, the system may provide the changed conversion based data to the touch IC 300.

The conversion based data may be stored in the touch IC 300, or may be received from the server via the communication module of the electronic device.

In operation 540, the encryption unit 320 may encrypt the input value using the secure key. Every time the touch event occurs, the encryption unit 320 may perform encryption. That, if a new touch event occurs in operation 550, the encryption unit 320 may encrypt an input value corresponding to the new touch.

Figure 6:
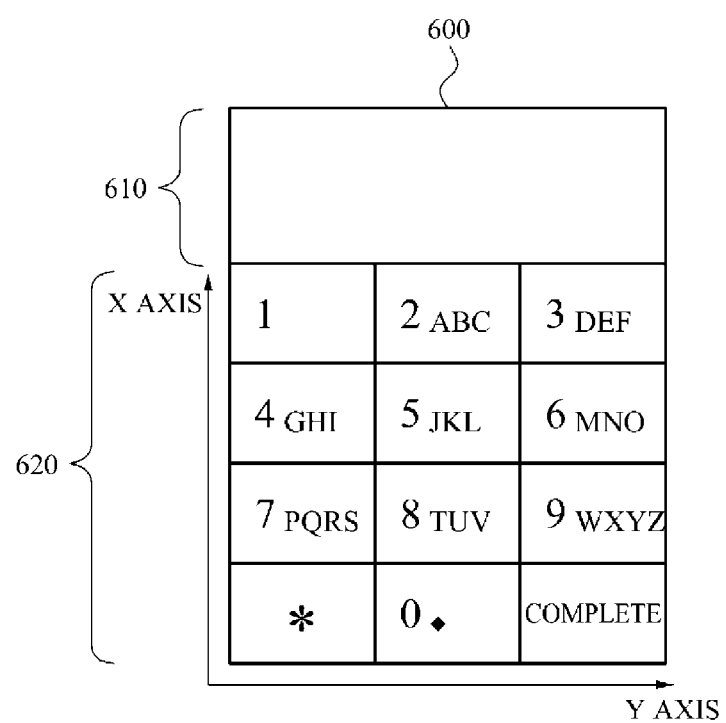
FIG. 6 is a diagram illustrating an input interface according to an exemplary embodiment of the invention.

FIG. 6 is a diagram illustrating an input interface according to an exemplary embodiment of the invention.

Referring to FIG. 6, the input interface corresponds to a number keyboard and may be displayed on a partial area 620 of the touch panel 600. A symbol, for example, "*" and the like may be displayed on an area 610 where the input interface may not displayed, based on a feedback signal. Conversion based data may include coordinate data of the area 610 and area 620. In the example of FIG. 6, when the user touches "1", an input value is "1" and coordinate data is a coordinate value of X axis and Y axis where the touch has occurred on the area 620.

Figure 7:
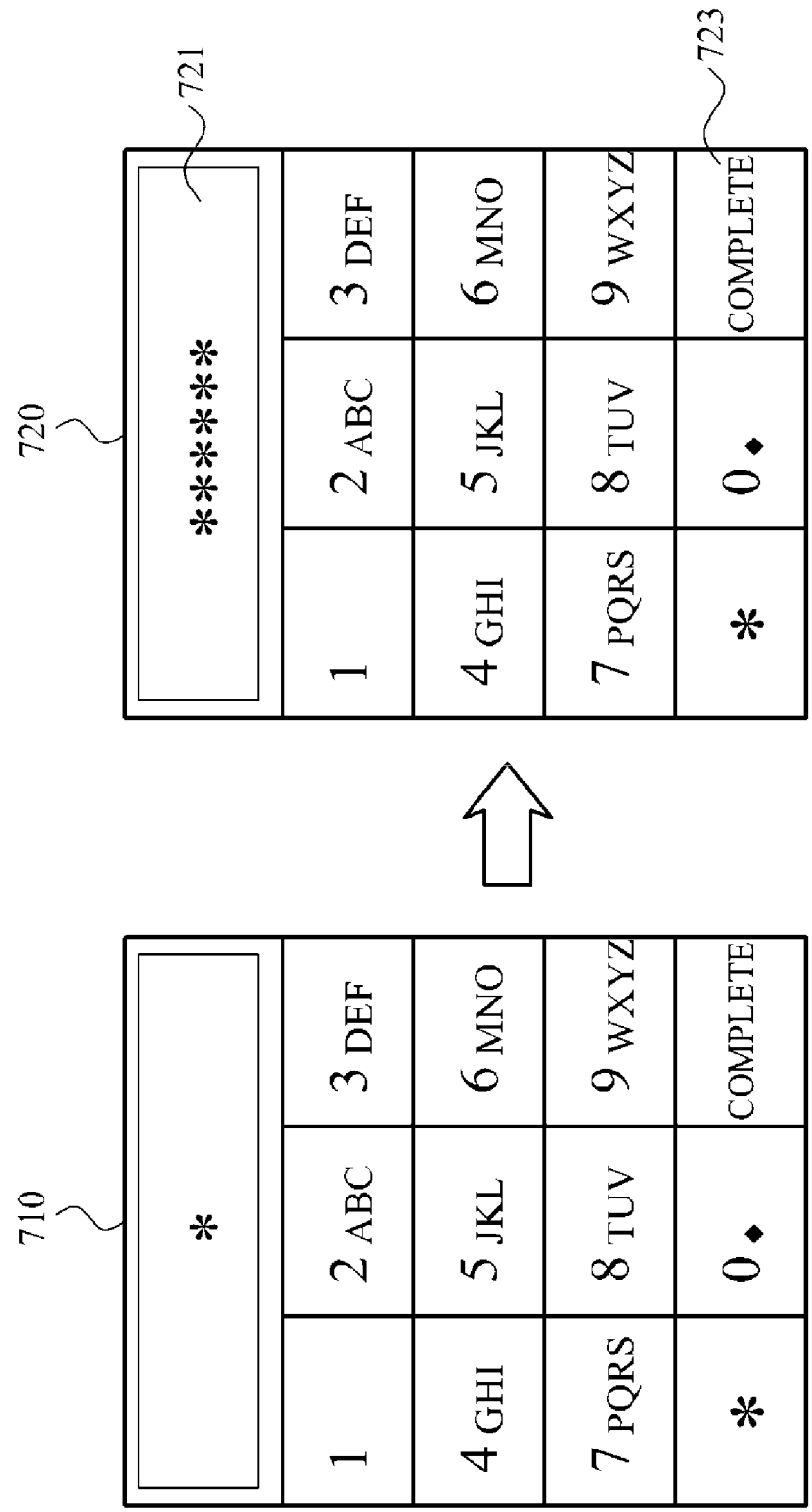
FIG. 7 is a diagram illustrating a display screen with encrypted data according to an exemplary embodiment of the invention.

FIG. 7 is a diagram illustrating a display screen with encrypted data according to an exemplary embodiment of the invention.

Referring to FIG. 7, on a screen 710, a single touch event may have occurred in an encryption mode, which may be illustrated by "*" displayed on screen 710. On a screen 720, six touch events may have occurred in the encryption mode. Six "*" displayed on a display area 721 of the screen 720 may correspond to a kind of feedback signal. Referring again to the example of FIG. 7, if the touch IC 300 senses that a complete button 723 is touched, the touch IC 300 may determine that data input of a user is completed. If the input is set to be automatically completed if six key inputs are received, the touch IC 300 may determine that the data input of the user is completed without sensing that the complete button 723 is touched.

FIG. 8 is a diagram illustrating a method for obtaining a secure key according to an exemplary embodiment of the invention.

Referring to FIG. 8, the unique key storage unit 801 may store the same or similar unique key as a unique key stored in a touch IC. The unique key may be allocated in production of the touch IC and a communication module 237 of an electronic device. Accordingly, the unique key may correspond to a key value that is stored in a secure memory area inaccessible from an outside.

In operation 811 or operation 813, a system or the touch IC may transmit a secure key request message for requesting a secure key to the communication module 237.

In operation 820, the communication module 237 may generate a secure key request packet and transmit the secure key request packet to an authentication server.

In operation 830, the communication module 237 may start capturing a packet received from the authentication server. Here, capturing of the packet may indicate verifying whether a packet including the secure key is received by decoding a header of the received packet. Capturing of the packet may be performed if a reference period of time elapses after transmitting the secure key request packet to the authentication server.

In operation 840, the authentication server may generate a new secure key or may transmit the stored secure key to the communication module 237.

In operation 850, the parsing unit 803 of the communication module 237 may parse the secure key from the packet including the secure key among packets received from the authentication server, and may transfer the parsed secure key to the encryption unit 805.

In operation 860, the encryption unit 805 may encrypt the parsed secure key using the unique key stored in the unique key storage unit 801.

In operation 873, the encryption unit 805 may transfer the encrypted secure key encrypted to the touch IC. In operation 871, the encrypted secure key may be transferred to the touch IC via a system.

In operation 880, the encryption unit 805 may receive the encrypted secure key from the communication module 237 and decrypt the encrypted secure key using the unique key stored in the unique key storage unit 801.

In a secure mode, a touch IC may randomly transmit user input data to a changed server.

Even though a touch panel and the touch IC are herein described as an example, exemplary embodiments of the present invention may be applied to other input devices. For example, it may be possible to receive a user input command using a gyro sensor, a voice input, and the like, and to encrypt a sensing value using a sensor controller including an IC. That is, the sensor controller may encrypt a sensing value itself and transmit the encrypted sensing value without intervention of a main processor.

An input interface may receive a multi-touch. For example, an electronic device may arrange a plurality of the same numbers on a touch panel, and may determine that the user input is competed if the user simultaneously touches the same numbers. Here, the numbers may be randomly arranged. For example, a number pad of Table 1 may be displayed as the input interface.

TABLE 1

| 3 | 6 | 1 | 7 | 6 |
| 8 | 2 | 4 | 2 | 8 |
| 5 | 5 | 3 | 9 | 0 |
| 9 | 1 | 4 | 7 | 0 |

In this example, if the plurality of same numbers is simultaneously touched, a coordinate data obtainment unit included in the touch IC may be configured to obtain coordinate data about an occurrence location of a touch event. For example, if two "6"s are simultaneously touched on Table 1, the coordinate data obtainment unit may obtain coordinate about "6" located in a first line and a second column or coordinate data about "6" located in the first line and a fifth column. Accordingly, it may be possible to more accurately obtain a user input value.

According to exemplary embodiments of the present invention, it may be possible to protect important information input that may be received from a user.

Also, according to exemplary embodiments of the present invention, it may be possible to reinforce a security feature of an electronic device by enabling various types of electronic devices using a touch screen or a touch panel to encrypt information, which may be inputted via the touch screen or the touch panel, using a touch IC.

That is, it may be possible to reduce the risk of a hacking attack by encrypting sensitive information, which may be inputted via the touch screen or the touch panel, using the touch IC.

Also, according to exemplary embodiments of the present invention, a touch IC may encrypt information without intervention of a main processor and may transmit the encrypted information to an outside server via a communication module. Therefore, even if the main processor may be hacked, it may be possible to protect important information.

The exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the exemplary embodiments of the present invention, or they may be of the kind well-known and available to those having skill in the computer software arts.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An apparatus to secure input data, comprising:
a main processor to enter into a secure mode;
a touch panel to receive an input;
a touch integrated circuit (IC) to obtain coordinate data of the input, and to encrypt data related to the input using a secure key; and
a communication module to transmit the encrypted data related to the input,
wherein the data related to the input is encrypted in the secure mode, and the touch IC blocks a transfer path between the touch IC and the main processor of the electronic device such that the main processor is unaware of the input received by the touch panel during the secure mode.

2. The apparatus of claim 1, wherein the touch IC blocks a transfer path between the touch IC and the main processor to prevent the input from being sensed by the main processor.

3. The apparatus of claim 1, wherein the touch IC blocks a transfer path between the touch IC and the main processor to transmit the encrypted data to a server.

4. The apparatus of claim 1, wherein the touch IC transmits the encrypted data to the main processor, wherein the main processor is unable to decrypt the encrypted data.

5. The apparatus of claim 1, wherein a secure mode is entered into if an application requiring a security is executed, if a reference number or a reference pattern of keys are inputted via the touch panel, if a reference motion of the user or an electronic device is detected via a sensor, if an input of a reference number or a reference input pattern using other input devices, or if the secure mode entrance request signal is received from an authentication server.

6. The apparatus of claim 1, wherein the apparatus further comprises:
a transceiver to transmit the encrypted data to a communication module of an electronic device.

7. The apparatus of claim 6, wherein the transceiver transfers the encrypted data to the communication module without intervention of a main processor of the electronic device.

8. The apparatus of claim 6, wherein the transceiver transmits, to a server via the communication module, at least one of resolution information of the touch panel, size information of the touch panel, a location information of an input interface of the touch panel, the touch panel specification information, and the electronic device specification information.

9. The apparatus of claim 1, wherein the secure key corresponds to a key value to provide an asymmetric or symmetric encryption.

10. The apparatus of claim 1, wherein the main processor terminates the secure mode and ceases encryption of the data related to the input.

11. The apparatus of claim 1, wherein the input is a touch input provided by a user.

12. The apparatus of claim 1, wherein the touch IC further converts the coordinate data into a user input value.

13. The apparatus of claim 12, wherein the touch IC converts the coordinate data into the user input value corresponding to the input based on conversion data.

14. The apparatus of claim 13, wherein the conversion data comprises coordinate information allocated to one or more number keys, character keys, or symbol keys that are provided on the touch panel.

15. The apparatus of claim 14, wherein the conversion data is stored in the touch IC or is received from a server via a communication module of an electronic device.

16. An electronic device, comprising:
a main processor to enter into a secure mode;
a touch panel to receive an input;
a touch integrated circuit (IC) to encrypt, using a secure key, coordinate data of the input, or an input value corresponding to the coordinate data; and
a communication module to transmit the encrypted coordinate data or the encrypted input value to a server,
wherein the touch IC receives a request signal to enter the secure mode to perform encryption of the coordinate data of the input or the input value corresponding to the coordinate data in the secure mode, and
wherein the touch IC blocks a transfer path between the touch IC and the main processor of the electronic device such that the main processor is unaware of the input received by the touch panel during the secure mode.

17. The electronic device of claim 16, wherein the main processor provides, to the touch IC, conversion based data comprising coordinate information allocated to one or more number keys, character keys, or symbol keys that are provided on the touch panel.

18. A method for securing input data in an electronic device, the method comprising:
entering into a secure mode;
receiving an input using a touch panel;
obtaining coordinate data of the input using a touch integrated circuit (IC);
encrypting data related to the input using a secure key; and
transmitting, to a server, the encrypted data related to the input,
wherein the data related to the input is encrypted in the secure mode, and the touch IC blocks a transfer path between the touch IC and the main processor of the electronic device such that the main processor is unaware of the receiving of the input during the secure mode.

19. The method of claim 18, further comprising converting the coordinate data into an input value using the touch IC.

20. The method of claim 18, wherein the touch IC blocks a transfer path between the touch IC and the main processor to prevent the input from being sensed by the main processor.

21. The method of claim 18, wherein the touch IC blocks a transfer path between the touch IC and the main processor to transmit the encrypted data to a server.

22. The method of claim 18, wherein the touch IC transmits the encrypted data to the main processor, wherein the main processor is unable to decrypt the encrypted data.

* * * * *